(12) United States Patent  
Loeliger et al.

(10) Patent No.: US 9,081,103 B2  
(45) Date of Patent: Jul. 14, 2015

(54) PHOTON COUNTING IMAGING METHOD AND DEVICE WITH INSTANT RETRIGGER CAPABILITY

(75) Inventors: Teddy Loeliger, Uster (CH); Christian Broennimann, Baden (CH); Roger Schnyder, Brugg (CH)

(73) Assignee: Dectris Ltd., Baden (CH)

( * ) Notice: Subject to any disclaimer, the term of this patent is extended or adjusted under 35 U.S.C. 154(b) by 40 days.

(21) Appl. No.: 14/233,899

(22) PCT Filed: Jul. 19, 2012

(86) PCT No.: PCT/EP2012/064213  
§ 371 (c)(1),  
(2), (4) Date: Mar. 18, 2014

(87) PCT Pub. No.: WO2013/017425  
PCT Pub. Date: Feb. 7, 2013

(65) Prior Publication Data  
US 2014/0191136 A1 Jul. 10, 2014

(30) Foreign Application Priority Data  
Jul. 20, 2011 (CH) ........................ 1211/11

(51) Int. Cl.  
*G01T 1/20* (2006.01)  
*G01T 1/17* (2006.01)

(52) U.S. Cl.  
CPC ..................... *G01T 1/171* (2013.01)

(58) Field of Classification Search  
CPC ................. G01T 1/20; G01T 1/171  
See application file for complete search history.

(56) References Cited

U.S. PATENT DOCUMENTS

| 5,665,959 | A | * | 9/1997 | Fossum et al. | 250/208.1 |
| 5,856,666 | A | * | 1/1999 | Moulsley | 250/208.1 |
| 7,807,973 | B2 | * | 10/2010 | Mott | 250/362 |
| 8,338,791 | B2 | * | 12/2012 | Proksa et al. | 250/369 |
| 2006/0276706 | A1 | | 12/2006 | Klein et al. | |

FOREIGN PATENT DOCUMENTS

EP         0144674 A2    6/1985  
WO   WO 2004/064168 A1    7/2004

* cited by examiner

*Primary Examiner* — David Porta  
*Assistant Examiner* — Faye Boosalis  
(74) *Attorney, Agent, or Firm* — Edwin D. Schindler

(57) ABSTRACT

A method for photon counting imaging with improved high-rate counting performance includes the step of applying an instant retrigger capability with adjustable dead time in cells of the detector array and operates an apparatus using a layer of photosensitive material, an L×K array of photodetector elements arranged in the layer of the photosensitive material, an N×M array of readout unit cells, including amplifying elements and at least one readout unit cells for at least one photodetector elements. The readout unit cells are controlled by signal processing elements with each readout unit cell having internal signal processing elements to generate a discriminator output signal representing an amplified signal of the electron-hole pairs generated by an incident photon or a number of incident photons in the respective photodetector element. The discriminator output signal is generated by comparing the amplified signal with a predetermined threshold level and the discriminator output signal is generated whenever the amplified signal exceeds the threshold level.

17 Claims, 5 Drawing Sheets

PHOTON COUNTING IMAGING METHOD AND DEVICE WITH INSTANT RETRIGGER CAPABILITY

FIELD OF THE INVENTION

This invention relates to an enhanced photon counting imaging method and device for single x-ray counting.

X-ray diffraction patterns are useful in a number of applications, e.g. for the analysis of molecular structures, such as protein and virus molecules, and require photon counting imaging devices. Especially, protein and virus crystallography imposes stringent requirements on x-ray detectors, particularly where the x-ray source is high-flux synchrotron radiation that enables an experiment to be done rapidly.

Furthermore, an important and developing field is time-resolved diffraction experiments using synchrotron radiation, such as crystallography or powder diffraction analysis. Monitoring a time-dependent reaction in a sample, i.e. a crystal or a powder, can elucidate the time-dependent crystal or molecular changes that occur in a chemical reaction as well. High time resolution and speed are often critical in such monitoring.

BACKGROUND OF THE INVENTION (STATE OF THE ART)

An advanced photon counting imaging device for single x-ray counting is disclosed in U.S. Pat. No. 7,514,688 B2 (aus WO 2004/064168 A1) and is directed to increasing the time resolution capabilities of a photon counting imaging device. This is achieved by a photon counting imaging device for single x-ray counting, including a layer of photosensitive material, a source of bias potential, a source of threshold voltage supply, an N×M array of photodetector elements formed using the layer of photosensitive material, each photodetector element having a bias potential interface and a photodetector element output interface, the bias potential interface of each photodetector element being connected to the bias potential, an N×M array of high-gain low-noise readout unit cells, one readout unit cell for each photodetector element, each readout unit cell including an input interface connected to the photodetector element output interface, a high-gain voltage amplifying unit including a discriminator unit, and a digital counter unit including a digital counter and a digital counter output interface connected in series, each digital counter unit counting an output signal of the discriminator unit, the output signal being proportional to a number of electron-hole pairs generated by a photon in the respective photodetector element, a multiplexing unit including a row select and a column select circuit allowing to access each readout unit cell, to read out the digital data as actually stored in the digital counter to the digital counter output interface, each digital counter output interface connected to an output bus, and the output bus being connected to a data processing unit controlling the multiplexing unit.

The drawback of this device is to be seen in the fact that this device and its counting can become paralyzed. The counter is basically triggered by the edge of the discriminator output signal and can therefore become paralyzed under certain circumstances. This will occur whenever the discriminator output signal representing an amplified signal of the electron-hole pairs generated by an incident photon or a number of incident photons is overlapping a former discriminator output signal. Since every discriminator output signal pulse is being counted, the individual single photon pulses are no longer correctly detectable or countable as single pulses once they start to merge into each other. Although the device is capable of counting single such pulses, it will not be able to count such pulses correctly if they come too close in sequence. In detail: At a high photon flux, pile-up of incoming charge pulses can paralyze the photon counting detector during the time the individual pulses overlap. Generally, a charge pulse is detected if it causes the discriminator input signal to cross and exceed the discriminator threshold level. This threshold transition causes a counter increment thus counting the individual charge pulses. At very high photon flux, the charge pulses may pile up such that the discriminator input signal continuously exceeds the threshold level. As a result, only the first charge pulse is counted and the other charge pulses included in the pile-up are not counted due to the missing threshold transitions. Therefore, the counting is paralyzed and the observed count rate deviates from the incoming photon rate. The higher the incoming photon rate, the more pulses are overlapping and the higher the deviation of the observed count rate due to the paralysis. At very high rates, the observed count rate is even decreasing with increasing photon rate and finally results in total paralysis with zero observed count rate. This characteristic shows an ambiguous relation between the observed count rate and the incoming photon rate and makes a well-defined count rate correction impossible. U.S. Pat. No. 7,514,688 B2 (WO 2004/064168 A1) does not address the problem of counting loss due to pulse pile-up. This is the starting point of the present invention and its aim is to further improve the photon counting performance by avoiding the counting loss and the paralyzing effect which occurs when too many photons are coming in and cause the pulse pile-up problem.

EP 0 144 674 B1 discloses a method for correcting count rate losses of radiation events. Such losses can occur due to detector dead times during an acquisition time. It is suggested to a) detect radiation events (Z) which are subject to dead time losses during the acquisition time to obtain a succession of radiation detector event triggers, then b) provide for each detected radiation event a dead time signal (DT) the width of which corresponds to the dead time generated by the detected radiation event (Z), then c) subdivide the acquisition time into a succession of evaluation time intervals (ETI). In the course of the execution of such a method, it is suggested to further d) measure the fractional amount (DT') of dead time within each evaluation time interval to obtain a measure for count rate losses, then e) evaluate from the fractional amount (DT') of dead time a replication probability r, depending on the replication number m that is only so large as to make the replication probability r be less than one for any particular fractional amount (DT') of dead time. Then, eventually, evaluate all radiation events detected between the end of one evaluation time and the end of a following one to generate f1) one pulse (P) for each detected radiation event between the ends of the succeeding evaluation times, and f2) a sequence of a number of pulses (P, P', P") for randomly selected events which selection corresponds to the replication probability r and which pulse number corresponds to the replication number m. To summarize, the problem of counting loss due to pulse pile-up is addressed in the following way: The exposure time is subdivided into successive evaluation time intervals; a measure for the pile-up probability in an evaluation time interval is determined by measuring the sum of all pulse widths by means of a separate time counting clock that has a high frequency and that is asynchronous to the pulses; additional counting pulses are randomly replicated in the following evaluation time interval according to the measure for the pile-up probability in order to compensate for the counting loss in the previous evaluation time interval. This approach has the following fundamental drawbacks: The continuous exposure time has to be subdivided into separate evaluation time intervals; the counting loss compensation is performed per evaluation time interval and is based on a measure determined in a previous evaluation time interval; the counting loss compensation is estimated and is based on an average measure for pile-ups and is not performed on a per event basis, thus only statistically corrects the count rate; a separate high-frequency clock is required for time counting; the time counting clock is asynchronous to the pulse events and introduces quantization noise to the time measurement; the pulse replication is randomly generated and not tied to the corresponding pile-up event.

US 2006/0276706 A1 discloses a medical imaging system. The system includes an input circuit configured to receive a voltage level signal indicative of a stream of pulses, a voltage level signal shape analyzer configured to determine shape characteristics of the received voltage level signal and an amount of time that the received voltage level signal matches a predetermined shape. A further counting circuit is configured to determine a true number of pulses from the shape characteristics and the amount of time. In other words, the problem of counting loss due to pulse pile-up is addressed in the following way: The pulse width of each pulse event is measured by means of a separate time counting clock that has a high frequency and that is asynchronous to the pulses; the measured pulse width is used to estimate the number of incoming pulses for each measured pulse. This approach has the following fundamental drawbacks: A separate high-frequency clock is required for time counting; the time counting clock is asynchronous to the pulse events and introduces quantization noise to the time measurement; a complex circuitry is required to generate the estimated number of pulses from the measured time value.

None of the above mentioned documents teaches a true solution to the pulse pile-up problem that can be reliably implemented in real photon counting imaging devices with stringent area and complexity limitations in the cells of the detector array. The problem of counting loss due to pulse pile-up can be described as follows: The counter is basically triggered by the edge of the discriminator output signal and can therefore become paralyzed under certain circumstances. This will occur whenever the discriminator output signal representing an amplified signal of the electron-hole pairs generated by an incident photon or a number of incident photons is overlapping a former discriminator output signal. Since every discriminator output signal pulse is being counted, the individual single photon pulses are no longer correctly detectable or countable as single pulses once they start to merge into each other. It is therefore the aim of the present invention to increase the performance and the reliability of a complete photon counting imaging device by reliably avoiding such paralysis and by improving the high-rate counting performance and the count rate correction means.

SUMMARY OF THE INVENTION

The invention offers a solution to the pulse pile-up problem using the method according to the introduction part of claim 1, and characterized in that the counts are being registered by counting for each signal pulse the number of dead time intervals of a predetermined width that corresponds to the width of the signal pulse at the discriminator output by starting a dead time interval sequence whenever the amplified signal is initially exceeding the threshold level, and counting the number of directly succeeding dead time intervals as long as the amplified signal is exceeding the threshold level. Because of this, after the predetermined dead time after a count has been registered, the counting in the pixels (readout unit cells) can be retriggered, i.e. the amplified signal is re-evaluated and the pixel is re-enabled for counting accordingly. In essence, after the dead time interval, a pixel will count again if the amplified signal at the discriminator input still exceeds the threshold level. The dead time is adjustable and can be generated by a circuit in each pixel. The dead time interval sequence is started exactly when the amplified signal is initially exceeding the threshold level. The dead time width can be set shorter than, comparable to or longer than the nominal single photon pulse width at the discriminator input or output. The nominal single photon pulse is defined as the respective pulse generated by a single incident photon for the effective processing parameter settings. To compensate for pixel-to-pixel variations, the adjustable dead time can be trimmed for each pixel by programming a dead time trim register in each pixel. The photon counting imaging method with instant retrigger capability is executable by a device according to claim 12.

The advantages of both the method and device of this invention are obvious: Through the instant retrigger capability, the detector and its counting become non-paralyzable. Hence, the observed count rate in the pixel is a monotonically increasing function of the incoming photon rate. This allows to perform a count rate correction with higher precision and unambiguous conversion of the counter values to the number of incident photons. This non-paralyzable counting method allows for higher count rates and for an unambiguous count rate correction. The photon counting imaging method and device with instant retrigger capability with adjustable dead time achieve improved high-rate counting performance and improved count rate correction.

Compared to the state of the art as reflected by the above mentioned documents, this invention has the following essential advantages: In order to discriminate the width of a signal pulse, this invention is based on generating a replication of a typical single photon pulse in a synchronous way in contrast to measuring the pulse width with a separate time counting clock that has a high frequency and that is asynchronous to the signal pulse. Therefore, a direct discrimination with the replicated pulse can be applied in order to achieve accurate timing precision. This is only possible because the replicated pulse is synchronously generated and starts at the same time as the signal pulse. In contrast to that, methods according to the above mentioned documents need a fast time counting clock to achieve good timing precision. Above all, the time counting clock is asynchronous to the signal pulse and the time measurement is subject to quantization noise for both the start and the end of the pulse width measurement. Consequently, the achievable time measurement precision is limited by the temporal resolution of the counting clock. A time counting clock with high frequency would increase the power consumption and introduce additional crosstalk in the sensitive pixel array and would require additional evaluation circuitry to process the time measurement. It is a crucial advantage of the present invention, that the pulse width of the generated dead time intervals is equal to or in the order of the nominal single photon pulse width whereas in described methods with asynchronous time counting clocks the required clock pulse widths have to be orders of magnitude shorter than the nominal single photon pulse width.

The basic problem and the solution according to this invention will be described in further detail in view of the drawings.

BRIEF DESCRIPTION OF THE DRAWINGS

Shown is in.

DETAILED DESCRIPTION OF THE INVENTION AND EXEMPLARY EMBODIMENTS

Figure 1:
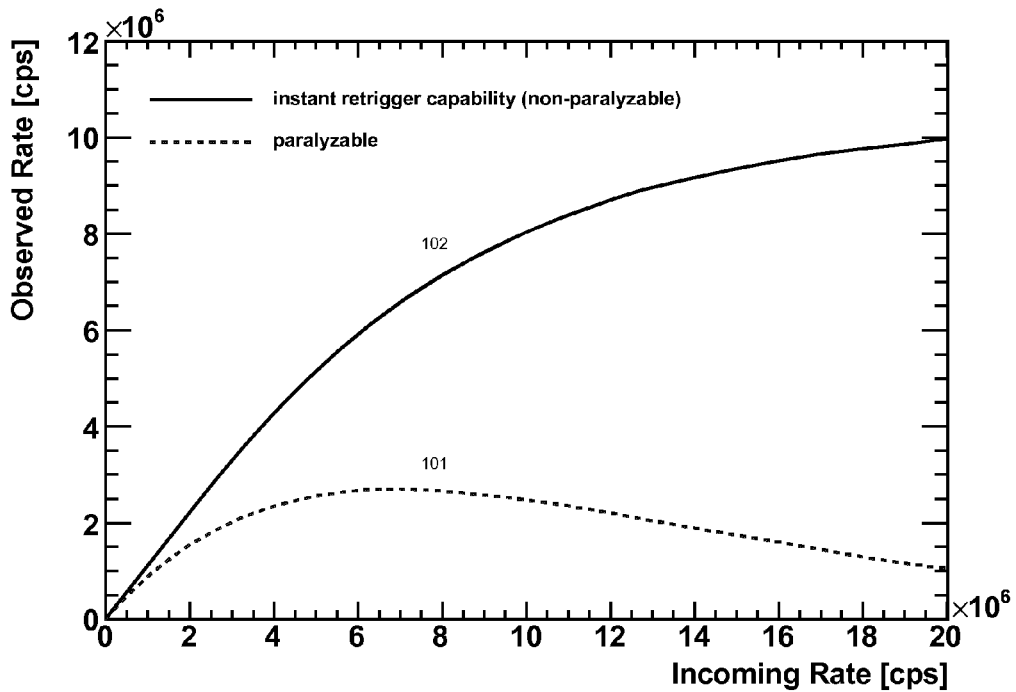
FIG. 1: Observed count rate versus actual incoming photon rate according to conventional (paralyzable) and retriggered (non-paralyzable) counting.

The generation of an electron-hole pair by the photoeffect is not shown and explained here since this is basic physics and is exhaustively described in U.S. Pat. No. 7,514,688 B2 (WO 2004/064168 A1). FIG. 1 shows the observed count rate versus the actual incoming photon rate in a photon counting imaging device. These characteristic curves represent a system-level simulation of statistically distributed pulses with idealized pulse shapes. The lower and dotted curve 101 represents conventional (paralyzable) counting and the upper and solid curve 102 enhanced (non-paralyzable) counting which is obtained by an instant retrigger capability of the counting circuit. This instant retrigger capability is the key characteristic of the present invention.

Figure 2:
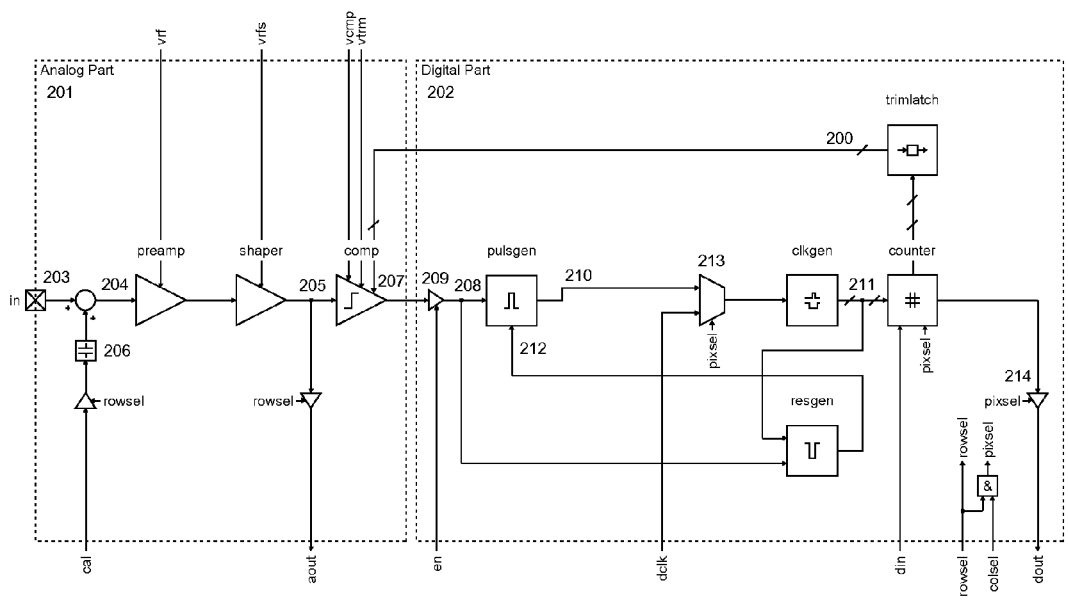
FIG. 2: Detailed block diagram of a conventional (paralyzable) readout unit cell (pixel)

In FIG. 2, the detailed block diagram of a conventional (paralyzable) readout unit cell (pixel) is shown. This pixel is divided into an analog part 201 and a digital part 202. The analog part 201 includes a bump pad 203 for the interface to the photodetector element and is connected to the input 204 of a charge sensitive amplifier comprising of a preamplifier (preamp) "preamp" and a shaper "shaper". Any charge pulse generated in the photodetector element is amplified by the amplifier and transformed into a voltage pulse signal at the output 205 of the amplifier. The size of the voltage pulse represents the electron-hole pairs generated by incident photons. For calibration purposes, a voltage source with the calibration voltage at the terminal "cal" is additionally connected to the input 204 of the amplifier via a calibration capacitor 206. The capacitance of the calibration capacitor 206 has a typical value in the order of about 1 fF allowing to be sensitive enough that a voltage change in the calibration voltage applied to the calibration capacitor 206 is sufficiently amplified by the amplifier to generate a pulse signal of typical size at the output 205 of the amplifier. The amplifier output signal is connected to the input 205 of a discriminator "comp" with adjustable threshold level and with individually adjustable threshold level correction. The discriminator "comp" is connected to a voltage source with the threshold voltage at the terminal "vcmp" defining the threshold level of the discriminator "comp" and to a voltage source with the trim voltage at the terminal "vtrm" defining the trim range of the threshold level correction. In addition, the discriminator "comp" is connected to the output 206 of a trim latch "trimlatch" that stores the trim values for the individual trim setting of the pixel and that is located in the digital part 202. By adjusting the threshold voltage, the trim voltage and the trim values, the threshold level of the discriminator "comp" can be set to any desired value for each pixel individually. Thus, the discriminator "comp" can be used to detect charge pulses of any size representing photo-generated charge or any fraction of it. The digital part 202 includes the counting circuit. The output 207 of the discriminator "comp" is connected to the input 208 of a pulse generator "pulsgen" using a gating element 209 that is controlled by the terminal "en". The terminal "en" is used to enable counting and to control the exposure, i.e. the time intervals that incident photons are counted by the counting circuit. The counting circuit includes the pulse generator "pulsgen", a clock generator "clkgen" and a counter "counter". The pulse generator "pulsgen" detects edges of a predetermined polarity at its input 208 and generates a signal pulse of predetermined width at its output 210 whenever an active edge occurs. At the same time, the pulse generator "pulsgen" is being locked and prevented from detecting new edges at its input 208. The subsequent clock generator "clkgen" generates adequate clock signals to be fed to the input 211 of the counter "counter" in order to register one count per signal pulse. In addition, the counting circuit includes a reset generator "resgen". It processes the input 208 of the pulse generator "pulsgen" and the output 211 of the clock generator "clkgen" and generates a reset signal at the input 212 of the pulse generator "pulsgen" whenever both the pulse generator input signal and the clock generator output signals have ended after registration of a count. The reset signal at the input 212 of the pulse generator "pulsgen" causes the pulse generator "pulsgen" to unlock and therefore to be enabled for detecting new edges at its input 208. As a result, counting is basically triggered by active edges of the signal at the input 208 of the pulse generator "pulsgen" and counting can become paralyzed if no edges occur. After completion of an exposure, the counter value is read out and reset by means of the multiplexer 213, the gating element 214, and the terminals "din", "dclk" and "dout". The counter values are then converted to count rate values according to the effective exposure time and are corrected for errors during counting by applying appropriate count rate correction.

Figure 3:
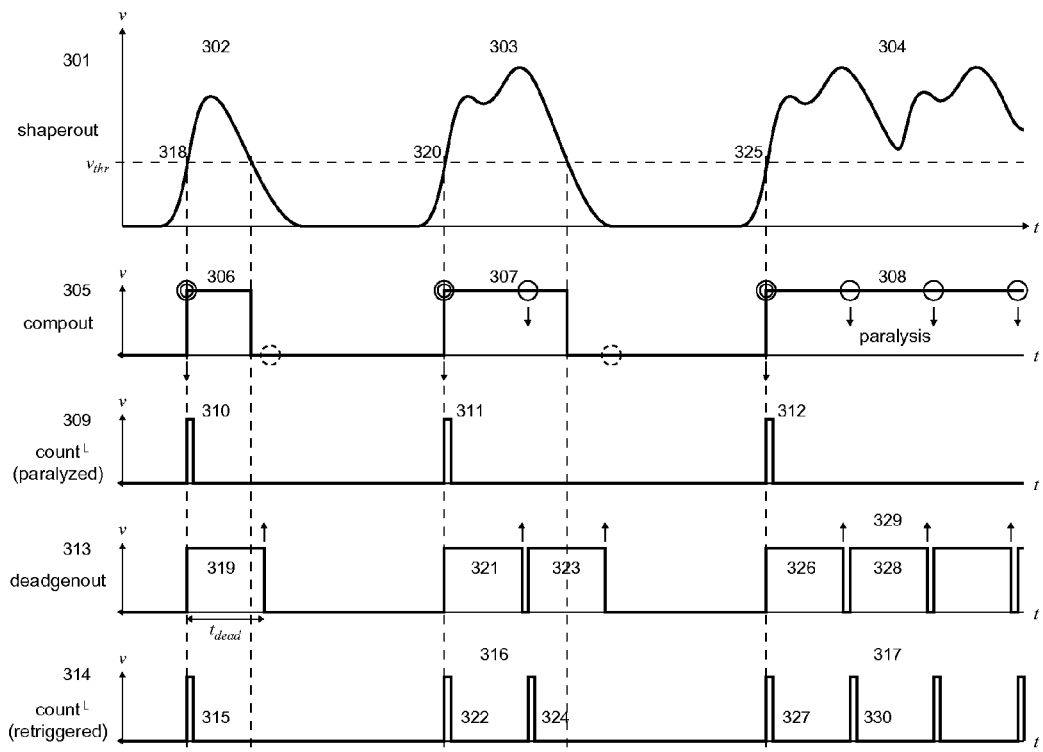
FIG. 3: Diagrams of electrical signals according to conventional (paralyzable) and retriggered (non-paralyzable) counting.

FIG. 3 shows diagrams of electrical signals illustrating the basic problem of paralyzable counting and its solution. The top diagram 301 shows the amplified signal "shaperout" for incident photons as a function of time. On the left, a single pulse 302 of a single photon is shown. In the middle, a pile-up pulse 303 of two photons is illustrated, and the right side shows a pile-up pulse 304 that represents a higher number of photons that arrived in short sequence. This pile-up pulse 304 represents a number of overlapping single pulses and exceeds the threshold level $v_{thr}$ for a longer time. The second diagram 305 shows the discriminator output signal "compout" corresponding to the amplified signal "shaperout" in the first diagram 301. The widths of the pulses of the discriminator output signal "compout" represent the widths of the single and pile-up pulses at the amplifier output with respect to the predetermined threshold level. The width of the left pulse 306 in the discriminator output signal "compout" is equal to the width of a single photon pulse. The middle pulse 307 refers to a pile-up of two photons and is somewhat longer than the single photon pulse. The right pulse 308 is a pile-up of a higher number of photons and is much longer than the single photon pulse. The third diagram 309 shows the count signal "count (paralyzed)" for conventional (paralyzable) counting. Each time the discriminator output signal "compout" rises, a short pulse is generated in the count signal "count (paralyzed)" and the counter is incremented. Thus, the single photon pulse 306 on the left correctly generates one count 310. However, the pile-up pulse 307 of two photons in the middle also generates only one count 311 instead of two. And the pile-up pulse 308 on the right, representing a higher number of photons, erroneously also generates only one count 312 due to the fact that the discriminator output signal "compout" only rises once and lasts for a long time thus paralyzing the conventional counting. The fourth diagram 313 shows the signal "deadgenout" at the output of a dead time generation circuit (dead time generator) for retriggered counting. This signal can be derived from the above amplified signal "shaperout" or from the above discriminator output signal "compout". Whenever the discriminator output signal "compout" initially rises, a dead time interval is started and a dead time pulse of predetermined width $t_{dead}$ is generated at the output of the dead time generator. After termination of each dead time pulse, the discriminator output signal "compout" is re-evaluated. Therefore, if the discriminator output signal "compout" is high, a new dead time interval is started and a new dead time pulse is generated at the output of the dead time generator. Otherwise, if the discriminator output signal "compout" is low, the dead time generator output signal "deadgenout" stays low until the discriminator output signal "compout" rises anew. The fifth diagram 314 shows the count signal "count (retriggered)" for retriggered (non-paralyzable) counting. This signal can be derived by combining the above discriminator output signal "compout" with the above dead time generator output signal "deadgenout" or directly from the dead time generator output signal "deadgenout". Each time the dead time generator output signal "deadgenout" rises, a short pulse is generated in the count signal "count (retriggered)" and the counter is incremented. Thus, the single photon pulse 302 on the left correctly generates one count 315 and the pile-up pulse 303 of two photons in the middle correctly generates two counts 316. The pile-up pulse 303 of two photons clearly shows the instant retrigger capability, since the counting is instantly retriggered, instantly meaning after a period equal to the width of a nominal single photon pulse. The pile-up pulse 304 on the right, representing a higher number of photons, generates multiple counts 317 and no paralysis occurs in this retriggered counting. However, the number of counts of this pile-up pulse 304 does not implicitly match exactly the number of photons. Overall, the complete time segment shown in the diagrams corresponds to an unknown number of incident photons of at least seven. While in the conventional (paralyzed) case only three counts 310 311 312 are registered, the retriggered (non-paralyzable) case yields seven counts 315 316 317, which is a much better guess for the actual number of incident photons. In case of retriggered counting, the rising edge 318 of the first pulse 302 of the amplified signal "shaperout" starts a dead time interval 319 and initiates a first count 315. Once the dead time interval 319 terminates, the amplified signal "shaperout" of this single photon pulse 302 is below the threshold level $v_{thr}$ and no further count or dead time interval is initiated. On the rising edge 320 of the second pulse 303 of the amplified signal "shaperout", a new dead time interval 321 is started and a count 322 is initiated. When this dead time interval 312 terminates, the amplified signal "shaperout" of this two photon pile-up pulse 303 still exceeds the threshold level $v_{thr}$, which causes another dead time interval 323 to start and the counter to retrigger, thus correctly adding a second count 324 for this two photon pile-up pulse 303. When the newly started dead time interval 323 terminates, the amplified signal "shaperout" is below the threshold level $v_{thr}$ and no further count or dead time interval is initiated. Only on the rising edge 325 of the third pulse 304 of the amplified signal "shaperout", a new dead time interval 326 is started and a count 327 is initiated. When this dead time interval 326—the first dead time interval of this long pile-up pulse 304—terminates, the amplified signal "shaperout" still exceeds the threshold level $v_{thr}$. This causes a second dead time interval 328 to start in this dead time interval sequence 329 and the counter to be retriggered, thus adding a new count 330. This process of retriggering in the actual dead time interval sequence 329 repeats until at the same time a dead time interval terminates and the amplified signal "shaperout" is below the threshold level. After that, a new start of a dead time interval and a new count only occur when the amplified signal "shaperout" is exceeding the threshold level $v_{thr}$ anew. In the time segment shown, the dead time interval sequence 329 of the third pulse 304 of the amplified signal "shaperout" does not terminate since the amplified signal "shaperout" does not return below the threshold level $v_{thr}$. Therefore, the counting is retriggered three times for this pulse 304 for the time segment shown and a total of four counts 317 are registered respectively.

The method for photon counting imaging with instant retrigger capability is characterized in that the counts are being registered by counting each number of dead time intervals of a predetermined width that corresponds to the width of each signal pulse at the discriminator output. This is achieved by starting a dead time interval sequence whenever the amplified signal is initially exceeding the threshold level and by counting the number of directly succeeding dead time intervals as long as the amplified signal is exceeding the threshold level. In a particular embodiment, a count is being registered and a dead time interval sequence is started whenever at the same time no dead time interval sequence is currently running and the amplified signal is initially exceeding the threshold level. Further, after termination of each dead time interval of the running dead time interval sequence, the amplified signal is re-evaluated. If the amplified signal then exceeds the threshold level, the counting is retriggered, thus registering a new count, and the dead time generation is started anew for further potential retriggering. Otherwise, if the amplified signal does not exceed the threshold level after termination of the dead time interval, the counting is not retriggered, thus registering no new count, and the dead time interval sequence is ended.

In order to increase the time resolution capabilities of the photon counting imaging method, the generated output signal can be accompanied by a time stamp generated by a time piece. Due to this measure beside the normal operation of the photon counting imaging method, the amplified output signal can be treated separately with respect to the occurrence of the photon hitting the respective photodetector element. The time piece can be realized as a counter being pulsed with a specific frequency. The time stamp therefore is derived by the actual value of the counter when a photon hits the photodetector element and the simultaneous output signal occurs.

Figure 4:
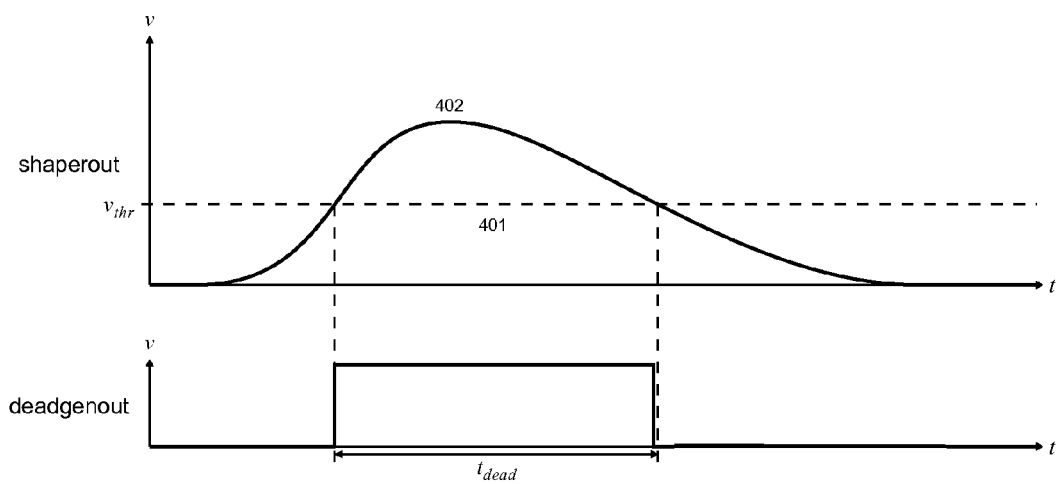
FIG. 4: Diagrams of electrical signals according to retriggered (non-paralyzable) counting with unity dead time overlap (dead time overlap equal to 1)
Figure 5:
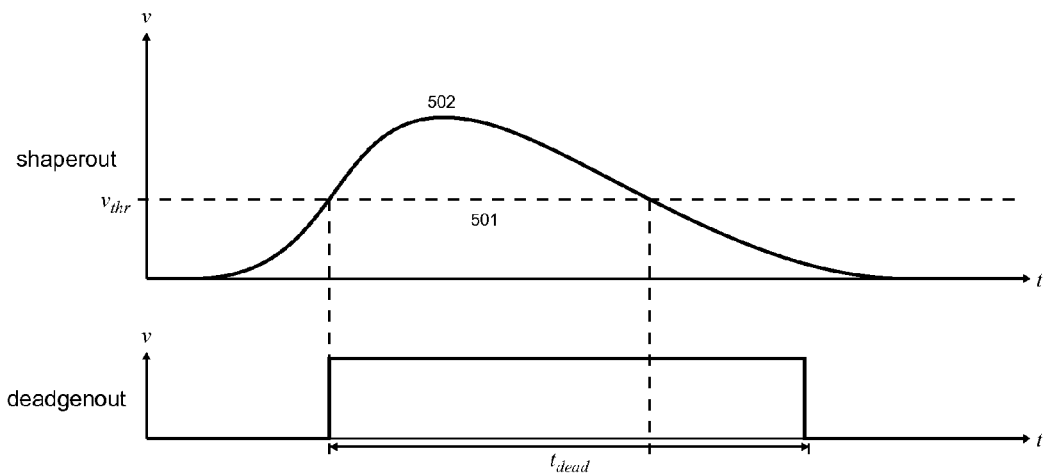
FIG. 5: Diagrams of electrical signals according to retriggered (non-paralyzable) counting with high dead time overlap (dead time overlap equal to 1.5)
Figure 6:
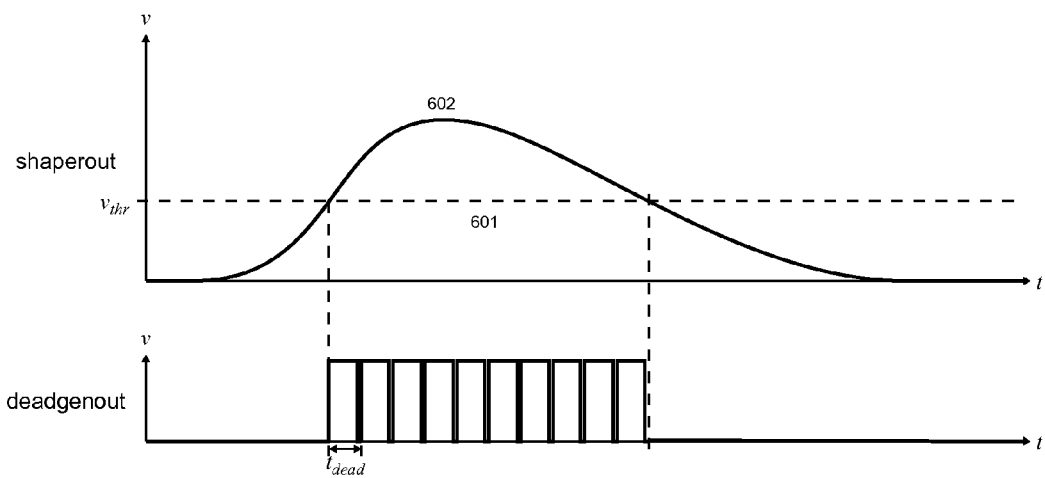
FIG. 6: Diagrams of electrical signals according to retriggered (non-paralyzable) counting with low dead time overlap (dead time overlap equal to 0.1)

In general, the width of the dead time is adjustable so that the best values can be used with respect to circuit parameter settings, counting resolution, and signal evaluation accuracy. The width of the dead time can be set shorter than, comparable to or longer than the nominal single photon pulse width at the discriminator input or output. The nominal single photon pulse is defined as the respective pulse generated by a single incident photon for the effective processing parameter settings. FIGS. 4 to 6 show diagrams of electrical signals illustrating dead time generation for different dead time overlaps. The dead time overlap is defined as the dead-time-to-pulse-width ratio, i.e. the ratio of the width of the dead time to the width of a nominal single photon pulse.

FIG. 4 illustrates dead time generation for a unity dead time overlap of 1, which means that the width of the dead time $t_{dead}$ is equal to the width 401 of a nominal single photon pulse 402. As a result, a nominal single photon pulse 402 generates exactly one count and any longer pulse, e.g. a pile-up pulse, generates additional counts. However, any deviation in the width 401 of the single photon pulse or the width of the dead time $t_{dead}$, e.g. due to parameter variations or noise, could result in a dead time overlap of slightly higher than one and would erroneously generate two counts for a nominal single photon pulse 402. Therefore, in order to cope with parameter variations, a dead time overlap of higher than 1 can be used.

FIG. 5 illustrates dead time generation for a high dead time overlap of 1.5, which means that the width of the dead time $t_{dead}$ is 1.5 times the width 501 of a is nominal single photon pulse 502. As a result, a nominal single photon pulse $t_{dead}$ generates exactly one count even if the pulse width 501 or the dead time slightly vary. Depending on the pulse shape and the statistics of the incident photons, the dead time overlap can be adjusted to an optimum value for most accurate counting. In principle, retriggered counting means that the width of a discriminator output signal pulse is measured or discriminated using a low resolution equal to the adjusted dead time. In order to improve the accuracy of this measurement or discrimination, the resolution can be increased by adjusting the dead time to lower values.

FIG. 6 illustrates dead time generation for a low dead time overlap of 0.1, which means that the width of the dead time $t_{dead}$ is 10 times shorter than the width is 601 of a nominal single photon pulse 602. As a result, a nominal single photon pulse 602 generates ten counts. Therefore, a scaling factor of 0.1 can be used to determine the number of incident photons based on the pulse counts. When doing this on a per-pulse basis, the exact number of one photon can be derived from the measurement even if the number of counts slightly differs from ten due to parameter variations or noise. In general, retriggered counting corresponds to measuring the total time that the amplified signal is over the discriminator threshold level using a resolution equal to the dead time. In particular, the measurement is performed asynchronously, activated by the amplified signal itself. This means, that no synchronous clock signal is required and that no counting is active in the idle state, i.e. when no signal pulse is present. In addition, the measurement of the time that a single pulse is over the discriminator threshold level is more accurate than a standard measurement with a synchronous clock signal, since the starting point of the measurement is exact and generates no quantization error due to clock signal synchronization. The accuracy of the measurement of the time that the amplified signal is over the discriminator threshold level can be determined by the adjustable dead time. High accuracy requires high time resolution and therefore short dead time resulting in low dead time overlap. The time that the amplified signal is over the discriminator threshold level is a good measure to determine the number of incident photons. Photon counting imaging with instant retrigger capability implies inherent pulse width measurement with asynchronous event-driven start activation, quiet idle state and adjustable time resolution.

Figure 7:
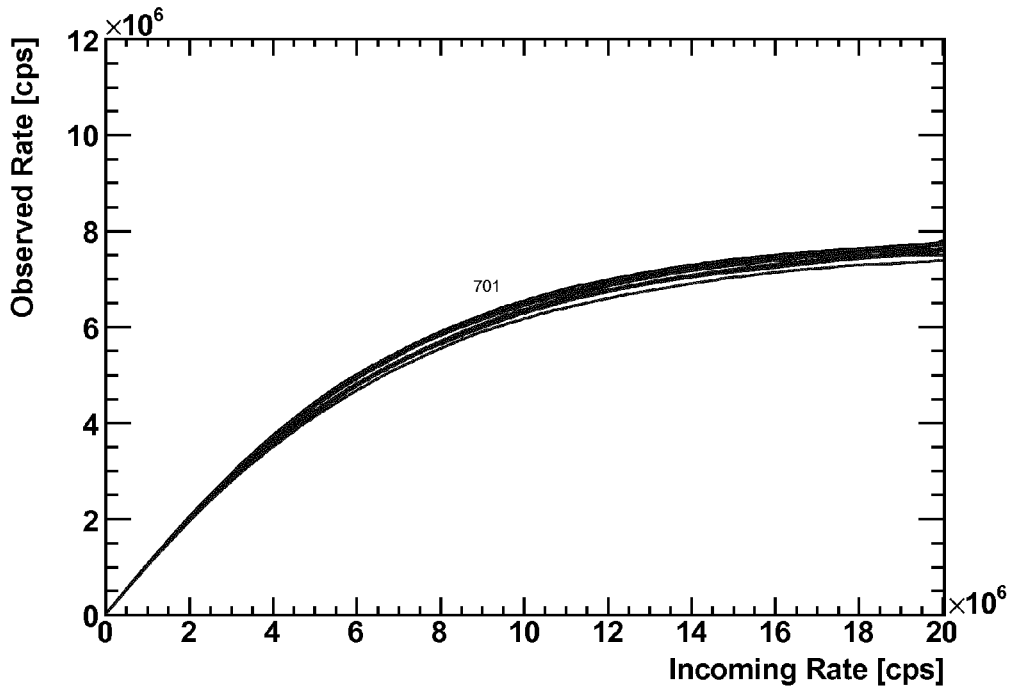
FIG. 7: Observed count rate versus actual incoming photon rate according to retriggered (non-paralyzable) counting for different readout unit cells (pixels) with pixel-to-pixel parameter variations.

The dead time adjustment can be done globally or pixel-wise. In particular, the dead time can be adjusted individually for each single pixel according to its characteristics in order to compensate for pixel-to-pixel variations. FIG. 7 shows the observed count rate versus actual incoming photon rate according to retriggered (non-paralyzable) counting for different pixels with pixel-to-pixel parameter variations. Each pixel has its own nominal single photon pulse width due to the variations. In addition, the globally adjusted dead time varies from pixel to pixel due to circuit parameter variations. Therefore, each pixel has its own characteristic curve 701 representing the observed count rate versus the actual incoming photon rate. In order to improve the individual characteristic curves and to compensate for all these variations, the adjustable dead time can be trimmed for each pixel by programming a dead time trim register in the pixel. The trimming of the dead time can be targeted alternatively at the same constant dead time for each pixel or at the same constant dead time overlap for each pixel of the pixel array. The dead time overlap is defined as the dead-time-to-pulse-width ratio, i.e. the ratio of the width of the dead time to the width of a nominal single photon pulse.

The device for executing the method preferably allows to select different operating modes so as to change the behavior of the complete device or single pixels. The operating modes can be activated or deactivated by programming mode registers. In order to avoid additional peripherals and interfaces, the mode registers can be implemented as virtual pixels that are part of the pixel array, which is extended by virtual columns or rows. These virtual pixels are no regular physical pixels of the detector array but accessed like regular pixels of the array. Thus, the existing addressing and communication schemes can be used to program the operating modes. For example, operating modes can be used to select between paralyzed and retriggered counting, i.e. to select between conventional (paralyzable) and retriggered (non-paralyzable) counting. Or operating modes can be used to select between normal and inverted polarity, i.e. to select if positive charge pulses or negative charge pulses at the input are being processed and detected. Or operating modes can be used to select between overflow-prone and overflow-free counter overrun, i.e. to select if overrunning causes the counter to overflow or to stop.

Count rate correction is applied to the observed count rate in order to compensate for deviations compared to the actual incoming photon rate mainly due to pile-up. It may be appropriate to apply the count rate correction to the final counter value of each pixel after a completed exposure. Thus, the exact incoming photon rate can be determined from the observed count rate of each pixel by using the relation shown in FIG. 1. For example, the exact incoming photon rate can be determined from the final counter value of each pixel by multiplying it with a predetermined factor that depends on the counter value itself. The final counter value of each pixel is a result from all counted discriminator output signal pulses with retriggered counting during the exposure time. This number corresponds to the accumulated widths of all discriminator output signal pulses including pile-up pulses. The predetermined factor depends on the counter value and therefore compensates for errors introduced at high count rates. Alternatively, it may be advantageous to apply the count rate correction to each individual discriminator output signal pulse or pile-up pulse during an exposure. Thus, the exact incoming photon rate is being determined on a per-pulse basis from the individual number of counts belonging to a single discriminator output signal pulse using retriggered counting. This number corresponds to the width of the single discriminator output signal pulse or pile-up pulse. For example, the exact incoming photon rate can be determined from the number of counts of the single pulses or pile-up pulses by multiplying these individual numbers of counts with an individual predetermined factor that depends on the counter value itself and by summing up the resulting values. The predetermined factor depends on the number of counts per pulse or pile-up pulse and therefore compensates for the non-linear relation between the number of incident photons of a pile-up pulse and the width of this pulse. This scheme represents an event-driven pulse signal evaluation and achieves improved count rate correction.

The photon counting imaging method can be improved by using multiple discriminators per pixel. Therefore, each of the discriminators generates a discriminator output signal by comparing the amplified signal with an individual predetermined threshold level. For each individual discriminator there is a dead time generation circuit and a counter unit that registers counts as a function of the individual discriminator output signal. Therefore, an individual dead time interval sequence is started whenever the amplified signal is initially exceeding the individual threshold level and counts are being registered by counting the number of dead time intervals of an individual predetermined width. The number of directly succeeding individual dead time intervals is individually counted as long as the amplified signal is exceeding the individual threshold level. The exact incoming photon rate can then be determined from the different counter values within each pixel corresponding to the different discriminators of that pixel. For example, this can be done by summing up the weighted individual counter values of the individual counters of that pixel. The weighted individual counter value is defined as the individual counter value multiplied with an individual predetermined factor.

Figure 8:
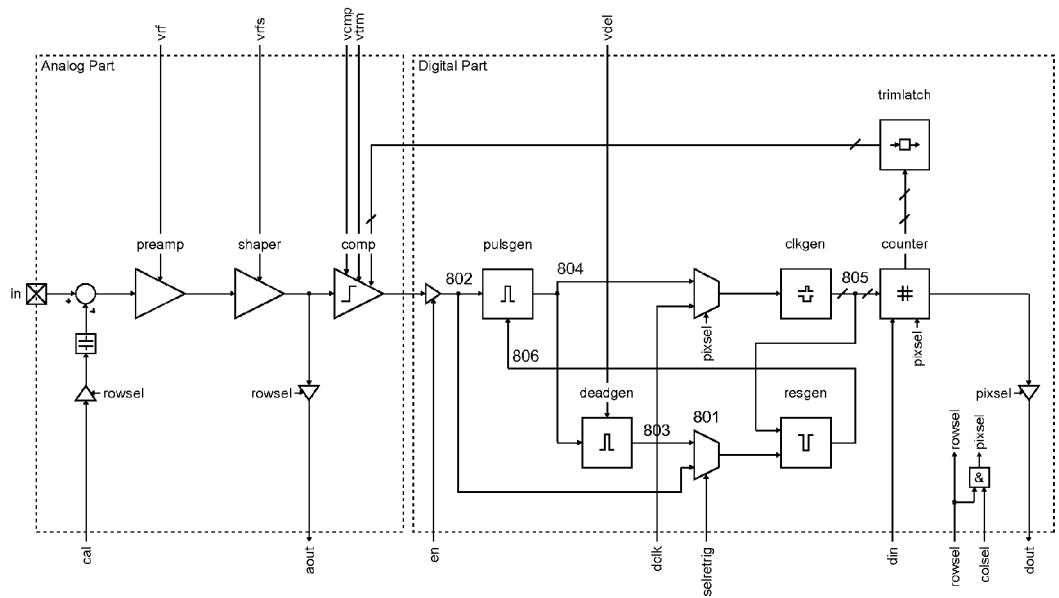
FIG. 8: Detailed block diagram of a retriggered (non-paralyzable) readout unit cell (pixel) including a dead time generation circuit.

FIG. 8 shows the detailed block diagram of an embodiment of the retriggered (non-paralyzable) readout unit cell (pixel) including a dead time generation circuit (dead time generator). In addition to the conventional (paralyzable) readout unit cell according to FIG. 2, this scheme in FIG. 8 comprises a dead time generator "deadgen", an additional multiplexer 801 and two additional terminals "vdel" and "selretrig" in order to implement the instant retrigger capability. Unlike in the conventional circuit, the reset generator "resgen" here does not use the signal at the input 802 of the pulse generator "pulsgen" to generate the reset signal but instead the signal at the output 803 of the dead time generator "deadgen". The dead time generator "deadgen" is connected to the output 804 of the pulse generator "pulsgen" and generates at its output 803 a pulse signal that starts when an active edge appears at its input 804 and that has a predetermined width. The width of this pulse signal determines the dead time of this circuit and can be adjusted by changing the voltage applied to the terminal "vdel". The reset generator "resgen" processes the output 803 of the dead time generator "deadgen" and the output 805 of the clock generator "clkgen" and generates a reset signal at the input 806 of the pulse generator "pulsgen" whenever both the dead time generator output signal and the clock generator output signals have ended after registration of a count. The reset signal at the input 806 of the pulse generator "pulsgen" causes the pulse generator "pulsgen" to unlock and therefore to be enabled for detecting new edges at its input 802. The pulse generator "pulsgen" is designed in the way that it generates a signal pulse of predetermined width at its output 804 in two cases. First, a respective pulse is generated whenever the pulse generator "pulsgen" is not locked and an active edge occurs at its input 802. Secondly, a respective pulse is generated whenever the pulse generator "pulsgen" is being unlocked by the reset signal at its input 806 while at the same time the signal at its input 802 is active, i.e. the signal at its input 802 is in the active state and no edge is currently occurring. As a result, counting is basically triggered by both by active edges of the signal at the input 802 of the pulse generator "pulsgen" and by active states of the signal at the input 802 of the pulse generator "pulsgen" occurring a dead time after the last count. Therefore, counting is instantly retriggered after the dead time and cannot become paralyzed even if no edges occur. By means of the terminal "selretrig" and the multiplexer 801, the counting mode of this circuit can be switched between conventional (paralyzable) counting according to FIG. 2 and retriggered (non-paralyzable) counting. Further, in order to have an unambiguous relation between the number of incident photons and the number of counts, an overflow-free counter is used in this circuit. This means, that the counting stops once it reaches a predefined high counter value even if more photons arrive. Beside this predefined counter value for stopping counting, additional predefined counter values higher than the mentioned one can be used for special purposes. For example, this count value coding can be used for pixel disable states, i.e. counter states that disable the pixel by inhibiting counting.

Figure 9:
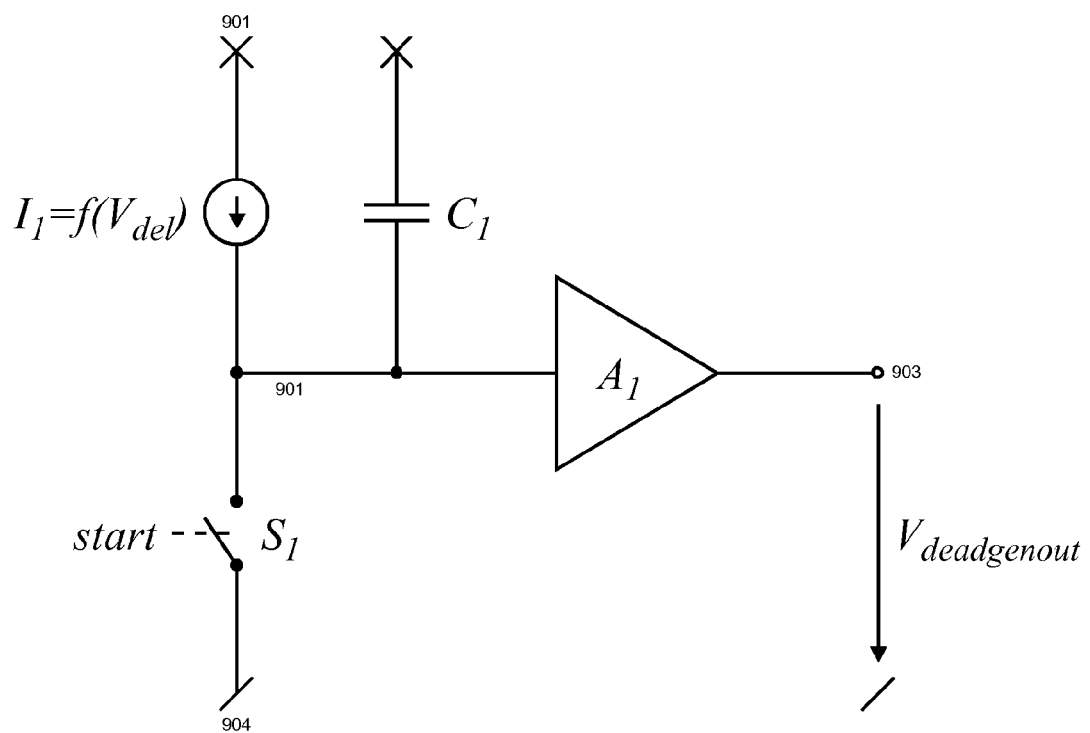
FIG. 9: Basic circuit schematic of a dead time generation circuit with adjustable dead time.

FIG. 9 shows the basic circuit schematic of an embodiment of the dead time generation circuit with adjustable dead time. In idle mode, the switch $S_1$ of this dead time generation circuit is open and the current source $I_1$ charges the internal node 901 at the input of the comparator $A_1$ to the positive supply voltage 902. This deactivates the output 903 of the circuit. A single-ended or a differential comparator with a clearly defined threshold can be used for the comparator $A_1$, e.g. a simple inverter or a series of inverters. Whenever counting is triggered by the amplified signal in the pixel, a positive edge occurs at the output of the discriminator in the pixel and a short pulse in the count signal is generated by the digital part of the pixel in order to increase the counter value by one. This pulse is also fed to the switch $S_1$ at the input of the here shown dead time generation circuit via the terminal "start" to enable the start of a dead time interval. The pulse closes the switch $S_1$ for a short time and discharges the internal node 901 of this circuit to the negative supply voltage 904 and therefore activates the output 903 of the circuit. After termination of the short pulse, the switch $S_1$ closes and the capacitor $C_1$ at the internal node 901 is being recharged by the adjustable current source $I_1$. As soon as the voltage at the internal node 901 exceeds the threshold voltage of the comparator $A_1$, the output 903 of the circuit is again deactivated and with this step, the dead time interval is terminated. The delay pulse signal $V_{deadgenout}$ at the output 903 of this circuit is used in the digital part of the pixel to re-enable the counting process and thus to retrigger counting if the discriminator output signal is active, i.e. to generate another pulse in the count signal. Therefore, the dead time is determined by the width of the short pulse in the count signal at the terminal "start", the time needed for charging the capacitor $C_1$ from the negative supply voltage 904 to the threshold voltage of the comparator $A_1$ by means of the adjustable current source $I_1$, and the response time of the comparator $A_1$. The dead time has a predetermined width that can be adjusted by the voltage $V_{del}$ which controls the current source $I_1$. For example, a single transistor can be used as current source. Dead time adjustment is achieved by charging the capacitor to a constant voltage by means of an adjustable current source. As an alternative, other adjustable circuit elements like an adjustable threshold voltage of the comparator or an adjustable capacitor can be used to adjust the dead time. For example, dead time adjustment can be achieved by charging the capacitor to an adjustable voltage by means of a constant current source. Furthermore, a series of delay circuit elements or a delay line can be used to generate the dead time. In this case, the width of the dead time can be adjusted by tapping the series or the delay line at variable positions.

For pixel-wise dead time adjustment, the dead time can be trimmed for each pixel by programming a dead time trim register in the pixel. The single bits of the dead time trimming are being written into the dead time trim register via the counter in the same way as the threshold trim bits of the discriminator threshold trimming. The dead time trim registers control an adjustable circuit element in the dead time generation circuit, e.g. a digital-to-analog converter for the generation of an adjustable current. For example, the adjustable current source $I_1$ in the dead time generation circuit in FIG. 9 can be realized by a globally settable current source and a number of current sources in parallel that are controlled by the dead time trim bits.

In order to experimentally determine the width of a nominal single photon pulse or the width of the dead time, the photon counting imaging device comprises a multiplexing means for external measurement of the output signals of the discriminator or the dead time generation circuit of the individual pixels. In a preferred embodiment corresponding to FIG. 8, the same terminal "dout" is used for both the regular readout of the counter in the pixel during normal operation and for the measurement of the respective pulse widths during time measurement operation, e.g. using a test mode.

The photon counting imaging method with instant retrigger capability achieves non-paralyzable counting and good high-rate counting performance. However, as shown by the solid curve 102 in FIG. 1, the observed count rate saturates for very high incoming photon rates. The saturation value depends on the dead time and is basically limited by the nominal single photon pulse width. The saturation deteriorates count rate correction and thus the nominal single photon pulse width limits the maximum usable count rate. In order to further improve the high-rate counting capabilities of retriggered counting, the nominal single photon pulse width can be reduced by actively resetting the detected charge pulses. Active reset can be implemented by an additional modulated or switched feedback resistor or transistor in parallel to the regular feedback in the preamplifier. This additional feedback is activated whenever a charge pulse is detected by the discriminator and immediately discharges the preamplifier thus terminating the charge pulse. As a result, the pulse width is reduced and improved high-rate counting performance is achieved.

The invention claimed is:

1. A method for photon counting imaging for single X-ray counting using a layer of photosensitive material, an L×K array photodetector elements arranged in the layer of the photosensitive material, an N×M array of readout unit cells including amplifying elements, K, L, M and N being numbers greater than or equal to one, at least one readout unit cell for at least one photodetector element, said at least one readout unit cells being controlled via signal processing elements, each said readout unit cell comprising internal signal processing elements allowing to generate a discriminator output signal representing an amplified signal of electron-hole pairs generated by at least one incident photon in said at least one photodetector element, the discriminator output signal being generated by comparing the amplified signal with a predetermined threshold level and the discriminator output signal being generated whenever the amplified signal exceeds the predetermined threshold level with a counter unit registering counts as a function of the discriminator output signal, said method comprising the steps of:

registering the counts by counting for each signal pulse a number of dead time intervals of a predetermined width corresponding to a width of the signal pulse at the discriminator output by starting a dead time interval whenever the amplified signal initially exceeds the predetermined threshold level; and, counting directly succeeding dead time intervals for as long as the amplified signal exceeds the predetermined threshold level.

2. The method for photon counting imaging for single X-ray counting according to claim 1, wherein said step of registering the counts is carried out with the count being registered and a dead time interval sequence is started whenever no dead time interval is currently running and the amplified signal is being reevaluated and, if the amplified signal exceeds the predetermined threshold level, said counting step is re-triggered and registers a new count, and generation of the dead time is started anew for further potential re-triggering, otherwise, if the amplified signal does not exceed the predetermined threshold level after termination of the dead time interval, then said counting is not re-triggered thereby registering no new count, and the dead time interval sequence is ended.

3. The method for photon counting imaging for single X-ray counting according to claim 1, further comprising the step of:

generating a time stamp via a time piece for the discriminator output signal so generated.

4. The method for photon counting imaging for single X-ray counting according to claim 1, further comprising the step of:

adjusting the dead time for each said readout unit cell.

5. The method for photon counting imaging for single X-ray counting according to claim 4, wherein the dead time is the same for each said readout unit cell.

6. The method for photon counting imaging for single X-ray counting according to claim 1, further comprising the step of:

adjusting a same dead line overlap for each said readout unit cell with the dead time overlap being defined as dead-time-to-pulse-width ratio, or a ratio of width of the dead time to width of a nominal single photon pulse, the nominal single photon pulse being defined as a respective pulse generated by a single incident photon for effective processing parameter settings.

7. The method for photon counting imaging for single X-ray counting according to claim 1, further comprising the step of:

activating or deactivating a plurality of operating modes via programming mode registers accessible as virtual readout unit cells.

8. The method for photon counting imaging for single X-ray counting according to claim 1, further comprising the step of:

determining an incoming photon rate by multiplying a final counter value of each said readout unit cell from all countered discriminator output signal pulses with re-triggered counting during exposure time with a predetermined factor depending upon counter value for obtaining a count rate correction, said exposure time being a number corresponding to accumulated widths of all said discriminator output signal pulses including pile-up pulses.

9. The method for photon counting imaging for single X-ray counting according to claim 1, further comprising the step of:

determining an incoming photon rate by multiplying individual counter values of each said readout unit cell, each resulting from only one discriminator output signal pulse with re-triggered counting, with an individual predetermined factor depending on counter value for obtaining an event-driven pulse signal evaluation and count rate correction, said re-triggering counting being a number corresponding to a width of a single said discriminator output signal pulse or pile-up pulse.

10. The method for photon counting imaging for single X-ray counting according to claim 1, wherein each said readout unit cell generates multiple individual discriminator output signals, each of said discriminator signals being generated by comparing the amplified signal with an individual predetermined threshold level, one counter unit per individual discriminator registering counts as a function of the individual discriminator output signal, counts being registered by counting the number of dead time intervals of an individual predetermined width by starting an individual dead time interval sequence whenever the amplified signal is initially exceeding the individual threshold level, and individually counting the number of directly succeeding individual dead time intervals for as long as the amplified signal is exceeding the individual threshold level.

11. The method for photon counting imaging for single X-ray counting according to claim 10, wherein resulting counter values of each said readout unit cell is determined by the sum of weighted individual counter values of the individual counters of a respective said readout unit cell, the weighted individual counter value being defined as the individual counter value multiplied by an individual predetermined factor.

12. An apparatus for photon counting imaging for single X-ray counting, comprising:

a layer of photosensitive material;

an L×K array of photodetector elements arranged in said layer of photosensitive material;

signal processing elements;

an N×M array of readout until cells including amplifying elements, K, L, M and N being numbers greater than or equal to one, one or a plurality of readout unit cells for one or a plurality of photodetector elements, said readout unit cells being controlled by said signal processing elements, each said readout unit cell comprising internal signal processing elements allowing to generate a discriminator output signal representing an amplified signal of electron-hole pairs generated by an incident photo or a plurality of incident photons in a respective said photodetector element, said discriminator output signal being generated by comparing the amplified signal with a predetermined threshold level and the discriminator output signal being generated whenever the amplified signal is exceeding the predetermined threshold level;

a counting unit registering counts as a function of the discriminator output signal; and, a counting circuit comprising a dead time generation circuit, the dead time having a predetermined width, starting of the dead time being enabled as a function of the discriminator output signal at an input of the dead time generation circuit whenever counting is triggered as a function of the discriminator output signal and delivering a delayed signal at the output of the dead time generation circuit that re-enables a counting process and that re-triggers counting after the dead time if the amplified signal still exceeds the predetermined threshold level.

13. The apparatus for photon counting imaging for single X-ray counting according to claim 12, wherein said dead time generation circuit comprises adjustable circuit element for adjusting the width of the dead time.

14. The apparatus for photon counting imaging for single X-ray counting according to claim 12, wherein said dead time generation circuit comprises tapped delay circuit elements for adjusting the width of the dead time.

15. The apparatus for photon counting imaging for single X-ray counting according to claim 14, wherein said tapped delay circuit elements are inverters.

16. The apparatus for photon counting imaging for single X-ray counting according to claim 12, wherein said dead time generation circuit comprises tapped delay lines for adjusting the width of the dead time.

17. The apparatus for photon counting imaging for single X-ray counting according to claim 12, further comprising multiplexing means for external measurement of the output signals of the discriminator or said dead time generator circuit of the individual readout unit cells for experimentally determining width of a nominal single photon pulse or the width of the deadtime, said nominal single photon pulse being defined as a respective pulse generated via a single incident photon for effective processing parameter settings.

\* \* \* \* \*